Dec. 11, 1928.
M. LEYTENS
1,694,422
SPRING SUSPENSION FOR LORRIES
Filed March 24, 1927
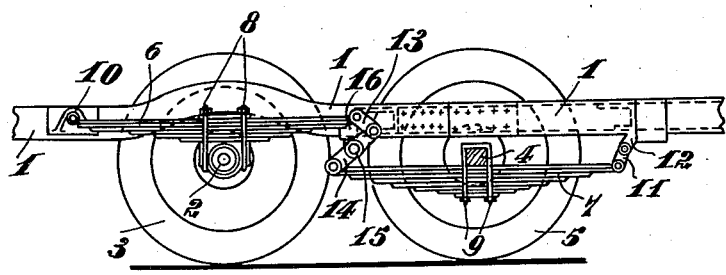
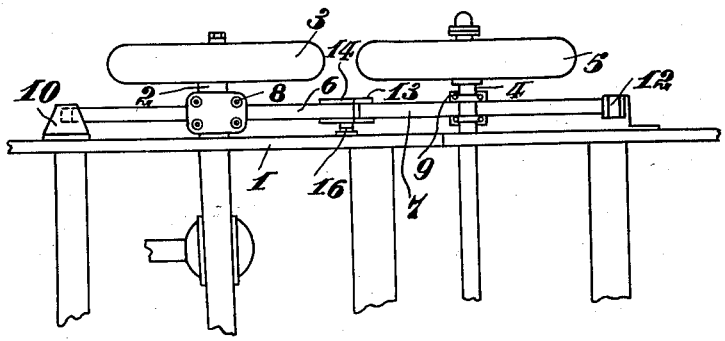
Inventor.
Marcel Leytens.
per: [signature]
Attorney.

Patented Dec. 11, 1928.

1,694,422

UNITED STATES PATENT OFFICE.

MARCEL LEYTENS, OF ANTWERP, BELGIUM.

SPRING SUSPENSION FOR LORRIES.

Application filed March 24, 1927, Serial No. 178,091, and in Belgium April 28, 1926.

The present invention relates to a spring suspension for lorries having near the driving axle a supplementary axle provided with wheels, the suspension blade-springs of the driving and the supplementary axles being mounted in the same vertical plane, the adjacent ends of the springs being pivotally connected to a swivelling two armed lever mounted on an axis fastened to the lorry frame.

The object of this invention is to provide an improved construction allowing to the supplementary axle to be brought nearer to the driving axle, and this without having to shorten the lengths of the blade-springs or to mount them in different vertical planes.

The present invention consists in the arrangement whereby the said adjacent blade-springs of both driving and supplementary axles overlap with their adjacent ends, said adjacent ends being pivotally connected to the swivelling lever, say one end above and the other beneath the swivelling axis of said lever.

Other features and advantages of the present invention will appear from the following description of an embodiment of the same, shown only by way of an example, in the accompanying drawings, wherein:

Fig. 1 is a vertical lengthwise view showing the improved suspension device as applied to a set of driving wheels;

Fig. 2 is the plan view of Fig. 1.

With reference to these Figures, 1 designates the rear part of the lorry frame or chassis, extended if need be, and 2 is the driving axle whereupon a set of wheels 3 has been mounted. In accordance with this invention, said driving axle 2 has been adjoined an extra trailing axle 4 equipped with a pair of wheels 5. The spring-mounting to provide for resiliency of the chest upon the axles 2 and 4 is carried out by means of sets of blade-springs respectively designated by 6 and 7, and fastened on to said axles by means of the respective yokes 8 and 9. The outside ends of these spring sets 6 and 7, are respectively attached on to a lug 10 of the frame 1 and, through a pair of link-bars 11, to a lug 12 which is likewise fixed on to the frame 1. As to the other ends of said spring sets 6 and 7, i. e. the ends adjacent one another, they are pivotally attached: that of the first-named 6 through link-bars 13 on to the upper end of a swivelling beam or two-armed lever 14, which can swivel on a horizontal axis 15 parallel to axles 2 and 4 and carried by a lug 16 depending from the chassis 1. The overlapping end of the spring 7 is pivotally connected with the lower end of said swivelling lever 14.

It will be readily understood that, owing to this manner of suspending the body, the load carried by the frame 1 will be equally distributed upon axles 2 and 4 at the three points 8, 12 and 15 under cooperation of the two sets of springs 6 and 7, and that said load will accordingly rest equally upon each of the two axles and sets of wheels 3 and 5.

I claim:

1. In spring-suspension for lorries having near the driving axle a supplementary axle provided with wheels, the suspension blade-springs of both axles being mounted in the same vertical plane, the adjacent ends of said blade-springs being pivotally connected to a swivelling two-armed lever mounted on an axis fastened to the lorry-frame, the arrangement whereby the said adjacent blade-springs of both driving and supplementary axles overlap with their adjacent ends, said adjacent ends being pivotally connected to the swivelling lever, say one end above and the other beneath the swivelling axis of said lever, substantially as described.

2. Spring-suspension for lorries having behind and close to the driving axle, a supplementary axle provided with wheels, comprising on each longitudinal side of the lorry-frame suspension blade-springs mounted upon the driving axle and suspension blade-springs mounted upon the supplementary axle, an axis fastened to and perpendicular to the longitudinal frame members, a two-armed lever pivotally mounted on said axis, one end of this swivelling lever being pivotally connected to the adjacent end of the supplementary axle spring, the other end of said lever being linked to the adjacent end of the driving axle springs, said suspension blade-spring being mounted in the same vertical plane above and below of the horizontal plane of the said axis, whereby the said blade springs overlap with their adjacent ends, said adjacent ends being pivotally connected to the said two-armed lever, say one end above and the other below the swivelling axis of said level, the opposite ends of both sets of springs being connected in the usual manner to the main frame members, substantially as described.

In testimony whereof I signed hereunto my name.

MARCEL LEYTENS.